(12) United States Patent
Nye et al.

(10) Patent No.: US 6,896,307 B2
(45) Date of Patent: May 24, 2005

(54) VARIABLE HEIGHT SLIDE-OUT MECHANISM

(75) Inventors: Timothy L. Nye, Elkhart, IN (US); Robert H. Schneider, Beaver Dam, WI (US)

(73) Assignee: Actuant Corporation, Milwaukee, WI (US)

( * ) Notice: Subject to any disclaimer, the term of this patent is extended or adjusted under 35 U.S.C. 154(b) by 0 days.

(21) Appl. No.: 10/939,026

(22) Filed: Sep. 10, 2004

(65) Prior Publication Data

US 2005/0029828 A1 Feb. 10, 2005

Related U.S. Application Data

(63) Continuation of application No. 10/761,020, filed on Jan. 20, 2004, now Pat. No. 6,805,391, which is a continuation of application No. 10/378,030, filed on Feb. 28, 2003, now Pat. No. 6,685,249, which is a continuation of application No. 09/564,663, filed on May 3, 2000, now Pat. No. 6,601,896.
(60) Provisional application No. 60/132,397, filed on May 4, 1999.

(51) Int. Cl.[7] .............................................. B62D 33/08
(52) U.S. Cl. ............................... 296/26.01; 296/26.09; 296/26.13; 296/165; 52/67; 74/30
(58) Field of Search ...................... 296/26.01, 26.02, 296/26.03, 26.04, 26.05, 26.08, 26.09, 26.12, 26.13, 165, 171, 172, 175, 167, 161, 35.3; 52/67; 74/30

(56) References Cited

U.S. PATENT DOCUMENTS

| | | | |
|---|---|---|---|
| 1,419,475 | A | 6/1922 | Smith |
| 1,471,549 | A | 10/1923 | Clement |
| 1,521,635 | A | 1/1925 | Lewis |
| 2,147,892 | A | 2/1939 | Gay |

(Continued)

FOREIGN PATENT DOCUMENTS

| | | |
|---|---|---|
| EP | 0 083 317 | 7/1983 |
| FR | 1084747 | 1/1955 |
| FR | 1 574 680 | 6/1969 |
| GB | 485330 | 5/1938 |

*Primary Examiner*—Lori L. Coletta
(74) *Attorney, Agent, or Firm*—Quarles & Brady LLP

(57) ABSTRACT

An operating mechanism for extending a slide-out section of a vehicle includes a pair of rail supports secured to a vehicle frame and a pair of rail members connected to the slide-out section with one rail member slidably engaging each rail support. Each rail member is driven by engagement of a rotary member with a linear intermeshing member, such as dedicated rack and pinion arrangements. A shaft connects the rotary engagers so that movement of the rail members is synchronized using a single drive unit. A pair of rollers are mounted to each rail support, one roller on each side of the racks, to support the rack relative to the associated rotary engager.

13 Claims, 4 Drawing Sheets

U.S. PATENT DOCUMENTS

| | | | |
|---|---|---|---|
| 2,581,192 A | 1/1952 | La Fleur | |
| 2,842,972 A | 7/1958 | Houdart | |
| 2,902,312 A | 9/1959 | Ferrera | |
| 3,137,041 A | 6/1964 | Mullen | |
| 3,169,280 A | 2/1965 | Jarman | |
| 3,181,910 A | 5/1965 | Thomas | |
| 3,482,716 A | 12/1969 | Leadley | |
| 3,596,416 A | 8/1971 | Hojka | |
| 3,672,238 A | 6/1972 | Young et al. | |
| 3,884,520 A | 5/1975 | Peterson | |
| 4,128,269 A | 12/1978 | Stewart | |
| 4,133,571 A | 1/1979 | Fillios | |
| 4,139,229 A | 2/1979 | Cooper | |
| 4,192,544 A | 3/1980 | Patterson | |
| 4,197,600 A | 4/1980 | Slabic | |
| 4,253,283 A | 3/1981 | May | |
| 4,270,791 A | 6/1981 | Tann | |
| 4,358,133 A | 11/1982 | Stucky | |
| 4,362,329 A | 12/1982 | Laube et al. | |
| 4,413,855 A | 11/1983 | Flanagan | |
| 4,480,866 A | 11/1984 | Komatsu | |
| 4,500,132 A | 2/1985 | Yoder | |
| 4,557,518 A | 12/1985 | Maclean et al. | |
| 4,657,300 A | 4/1987 | Penny et al. | |
| 4,861,049 A | 8/1989 | Losi | |
| 4,869,030 A | 9/1989 | Clark | |
| 4,874,197 A | 10/1989 | Grable | |
| 4,883,306 A | 11/1989 | Stucky | |
| 4,930,837 A | 6/1990 | Marsh et al. | |
| 4,950,123 A | 8/1990 | Brockhaus | |
| 4,955,661 A | 9/1990 | Mattice | |
| 4,960,299 A | 10/1990 | Steadman | |
| 5,050,927 A | 9/1991 | Montanari | |
| 5,090,749 A | 2/1992 | Lee | |
| 5,092,650 A | 3/1992 | Perlot | |
| 5,125,202 A | 6/1992 | Kissinger | |
| 5,127,697 A | 7/1992 | St. Marie | |
| 5,154,469 A | 10/1992 | Morrow | |
| 5,170,901 A | 12/1992 | Bersani | |
| 5,193,878 A | 3/1993 | Weaver | |
| 5,237,782 A | 8/1993 | Cooper | |
| 5,248,180 A | 9/1993 | Hussaini | |
| 5,295,430 A | 3/1994 | Dewald, Jr. et al. | |
| 5,332,276 A | 7/1994 | Blodgett, Jr. | |
| 5,333,420 A | 8/1994 | Eden | |
| 5,491,933 A | 2/1996 | Miller et al. | |
| 5,522,685 A | 6/1996 | Lessard | |
| 5,544,998 A | 8/1996 | Malinowski | |
| 5,620,224 A * | 4/1997 | DiBiagio et al. | 296/26.13 |
| 5,758,918 A | 6/1998 | Schneider | |
| 5,791,715 A | 8/1998 | Nebel | |
| 5,938,092 A | 8/1999 | Johnson | |
| 6,065,792 A | 5/2000 | Sciullo et al. | |
| 6,116,671 A | 9/2000 | Schneider | |
| 6,120,235 A | 9/2000 | Humphries et al. | |
| 6,176,045 B1 * | 1/2001 | McManus et al. | 52/67 |
| 6,182,401 B1 * | 2/2001 | McManus et al. | 52/67 |
| 6,196,604 B1 | 3/2001 | Hoh et al. | |
| 6,202,362 B1 * | 3/2001 | McManus et al. | 52/67 |
| 6,598,354 B2 * | 7/2003 | McManus et al. | 52/67 |

* cited by examiner

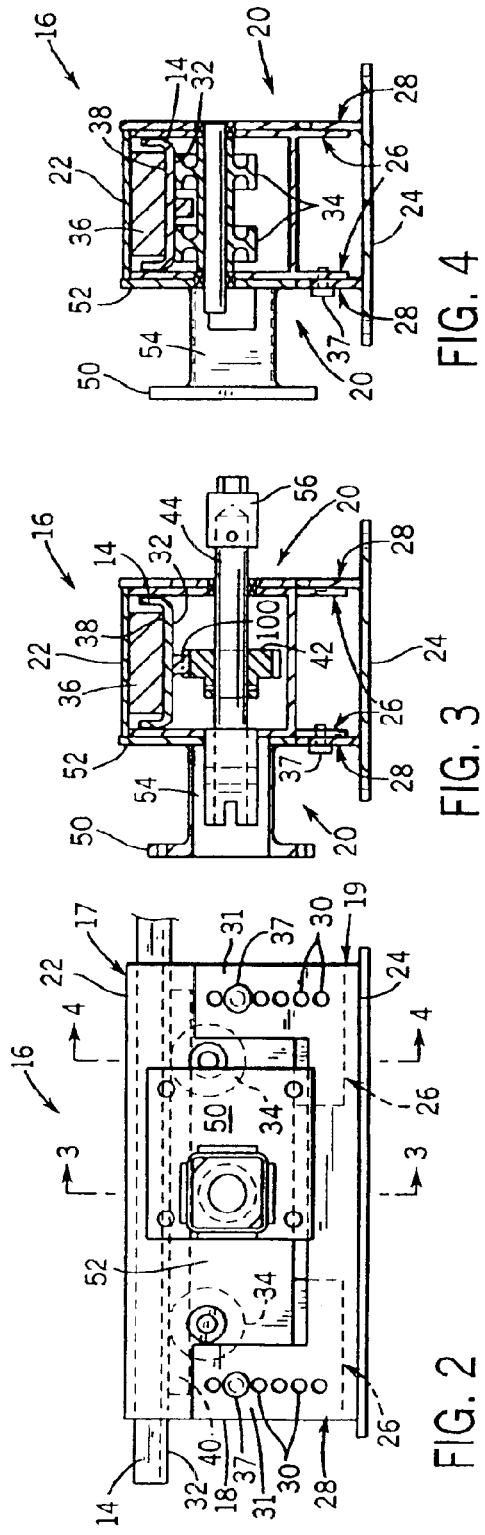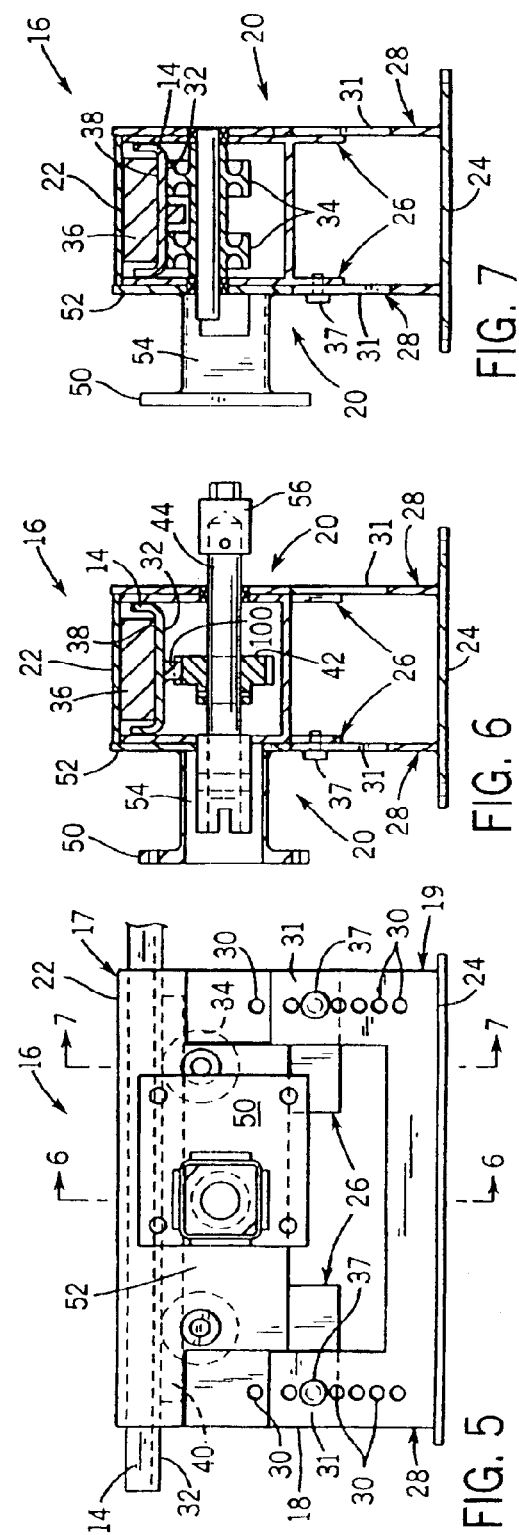

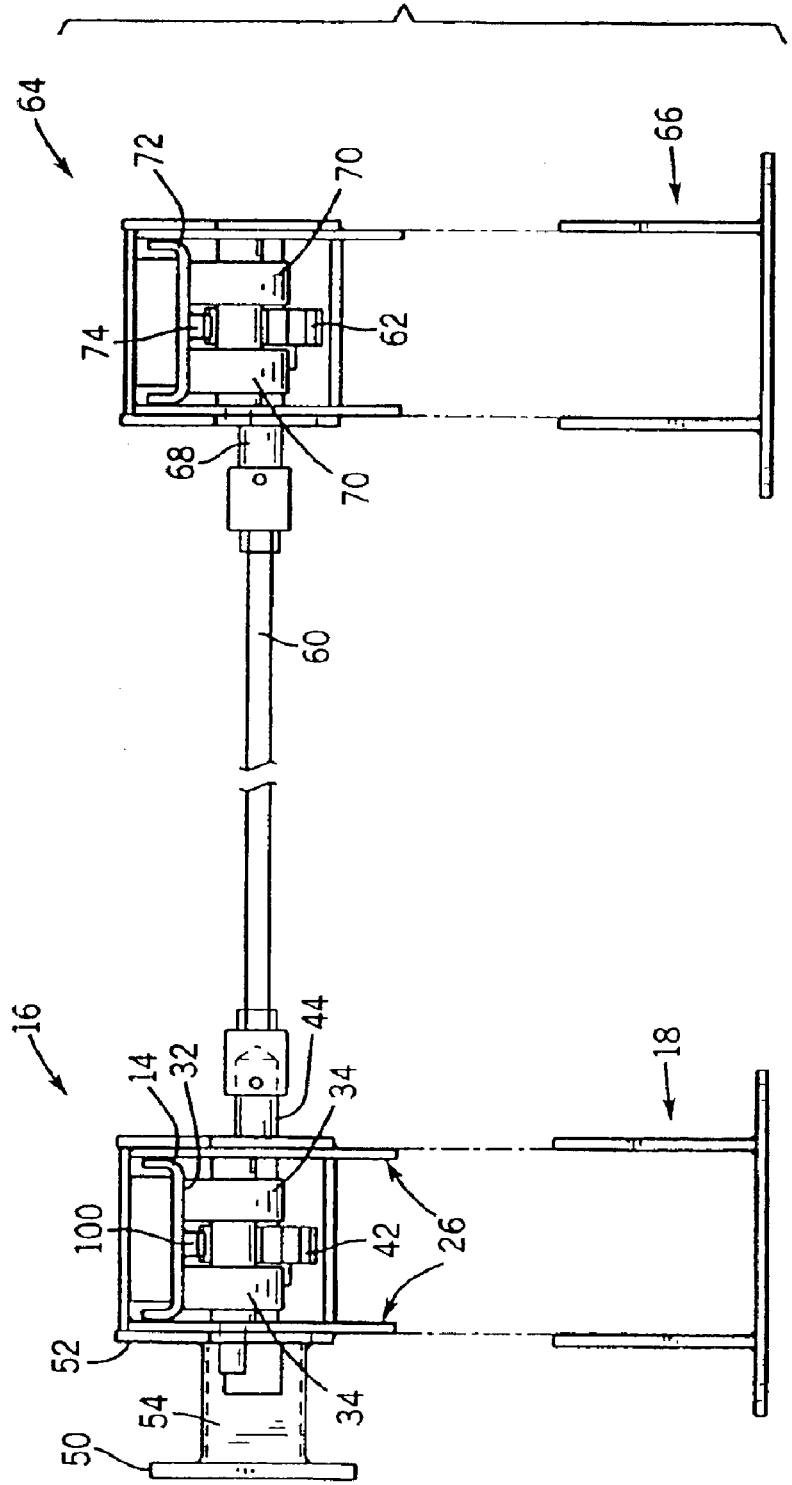

VARIABLE HEIGHT SLIDE-OUT MECHANISM

CROSS-REFERENCE TO RELATED APPLICATIONS

This application is a continuation of U.S. application Ser. No. 10/761,020, filed Jan. 20, 2004, issue fee paid, now U.S. Pat. No. 6,805,391 which is a continuation of U.S. application Ser. No. 10/378,030, filed Feb. 28, 2003, now U.S. Pat. No. 6,685,249, which is a continuation of U.S. application Ser. No. 09/564,663, filed May 3, 2000, now U.S. Pat. No. 6,601,896, which claims benefit to U.S. provisional application Ser. No. 60/132,397, filed May 4, 1999.

STATEMENT REGARDING FEDERALLY SPONSORED RESEARCH

Not Applicable.

BACKGROUND OF THE INVENTION

This invention relates to vehicles having extendable sections, and more particularly to an improved operating mechanism for moving a slide-out section between extended and retracted positions relative to the vehicle.

In order to increase the available interior space of recreational vehicles or trailers, it is known to provide a slide-out section (such as a bedroom) as part of the structure of the vehicle or trailer. A slide-out section is a raised platform enclosed on all but one side. During transit, the slide-out section is retracted and stored in the interior of the vehicle or trailer, with the exterior wall of the slide-out section approximately, flush with the exterior of the vehicle or trailer. To use the slide-out section after the vehicle is parked and leveled, it is slid outward from the vehicle to an extended position, thereby increasing the interior space of the vehicle.

The operating mechanism for moving the slide-out sections are typically devised to push the slide-out section away from the vehicle when extending the slide-out section, and pulls the slide-out section towards the vehicle when retracting the slide-out section. The mechanism for moving the slide-out section relative to the vehicle is fixed to the vehicle body and can include one or more sliding rails attached to the slide-out section. Typically, these sliding rails slide within rail supports fixed to the vehicle frame. Multiple sliding rails are typically utilized for wide slide-out sections. To conserve cost and spaces, typically the sliding rails are driven by a single drive unit. Thus, in mechanisms having multiple sliding rails, one rail is directly driven by the drive unit and the other rail moves in response to sliding of the slide-out section to which it is connected. Due to friction or an obstruction, it is possible for either of the driven or free sliding rails to lag behind the other rail during extension and/or retraction. This can cause the room to become skewed with respect to the vehicle. If this is not corrected, it can cause excessive wear, motor fatigue and/or an incomplete seal between the slide-out section and the vehicle when fully extended or retracted.

SUMMARY OF THE INVENTION

The present invention provides a height adjustable and multiple rail synchronized operating mechanism for moving a slide-out section of a recreational vehicle between retracted and extended positions.

In one aspect, the invention provides a mechanism for adjustably setting the height of an extendable slide-out section of a vehicle. The mechanism includes a frame supporting the slide-out section relative to the vehicle. The frame has two plates, a first plate is fixable to the vehicle and has at least one hole. The second plate is movable relative to the first plate and has a plurality of vertically spaced holes alignable with the hole(s) in the first plate. A fastener can be inserted through the aligned holes in the two plates to fix the plates relative to one another at one of a plurality of heights.

In preferred forms, the frame includes two spaced apart sides, each of which includes first and second plates. Each first plate includes a plurality of spaced apart holes each of which is linearly alignable with one of the plurality of spaced apart holes in each of the second plates. A rail member is fixedly mounted to the slide-out section and a rack and pinion arrangement movably mounts the rail member to the frame. The pinion is rotatably mounted between second plates of each side of the frame for engaging the rack of the rail member. A pair of rollers are rotatably mounted between the second plates of the frame to engage the rail member, preferably along opposite sides of the rack. An anti-friction member is disposed between the frame and the rail member.

Thus, one aspect of the invention provides for a vehicle slide-out room with a height adjustable frame. This mechanism is not limited to a single specific dimension and thus can be employed in multiple applications.

In another aspect, the invention provides an operating mechanism for extending a slide-out section of a vehicle. The operating mechanism includes a frame supporting the slide-out section relative to the vehicle. A pair of height adjustable rail supports are mountable to the frame. Each rail support includes two sections movable relative to one another and fixable with respect to one another at a plurality of heights. A pair of rails are connected to the slide-out section, and a pair of rack and pinion arrangements movably mount the rails to the rail supports so that the rails can extend and retract relative to the rail supports. A shaft connects the pinions so as to synchronize movement of the rails with respect to the rail supports.

In preferred forms, the two sections of each rail support are first and second plates with a plurality of spaced apart and linearly alignable holes as described above. There are two pairs of rotatable rollers, each pair engaging an associated one of the rail members, preferably one on each side of the associated rack.

Thus, another aspect of the present invention provides a variable height, multiple sliding rail slide-out mechanism in which the sliding rails are synchronized. The rails are synchronized using a shaft to couple the pinions for each sliding rail. Synchronized movement of the rails allows the slide-out section to extend and retract substantially uniformly and prevents it from becoming skewed with respect to the vehicle.

The foregoing and other objects and advantages of the invention will appear from the following description. In the description, reference is made to the accompanying drawings which form a part hereof, and in which there is shown by way of illustration preferred embodiments of the invention.

BRIEF DESCRIPTION OF THE DRAWINGS

FIG. 2 is a side view of the slide-out actuator of FIG. 1 in a lower position;

FIG. 3 is a cross sectional view of the slide-out actuator along line 3—3 of FIG. 2;

FIG. 4 is a cross sectional view of the slide-out actuator along line 4—4 of FIG. 2;

FIG. 5 is a side view of the slide-out actuator of FIG. 1 in an upper position;

FIG. 6 is a cross sectional view of the slide-out actuator along line 6—6 of FIG. 5;

FIG. 7 is a cross sectional view of the slide-out actuator along line 7—7 of FIG. 5;

FIG. 10 is a front plan view of the synchronized slide-out actuators of FIG. 1 in which the pinions are coupled by a shaft.

DETAILED DESCRIPTION OF THE PREFERRED EMBODIMENTS

The present invention provides an expandable bedroom slide-out attached to a known trailer or recreational vehicle which provides distinct advantages over the prior art as will be described and appreciated hereafter. In the preferred embodiment, the trailer or recreational vehicle (generally referred to as the vehicle) is equipped with a slide-out section used to provide additional interior room space. However, it should be understood that the invention can also apply to expandable sections or compartments provided on other vehicles for use in construction, military, medical, education, mobile broadcast and other applications, to expand the inside volume of the vehicle.

Figure 1:
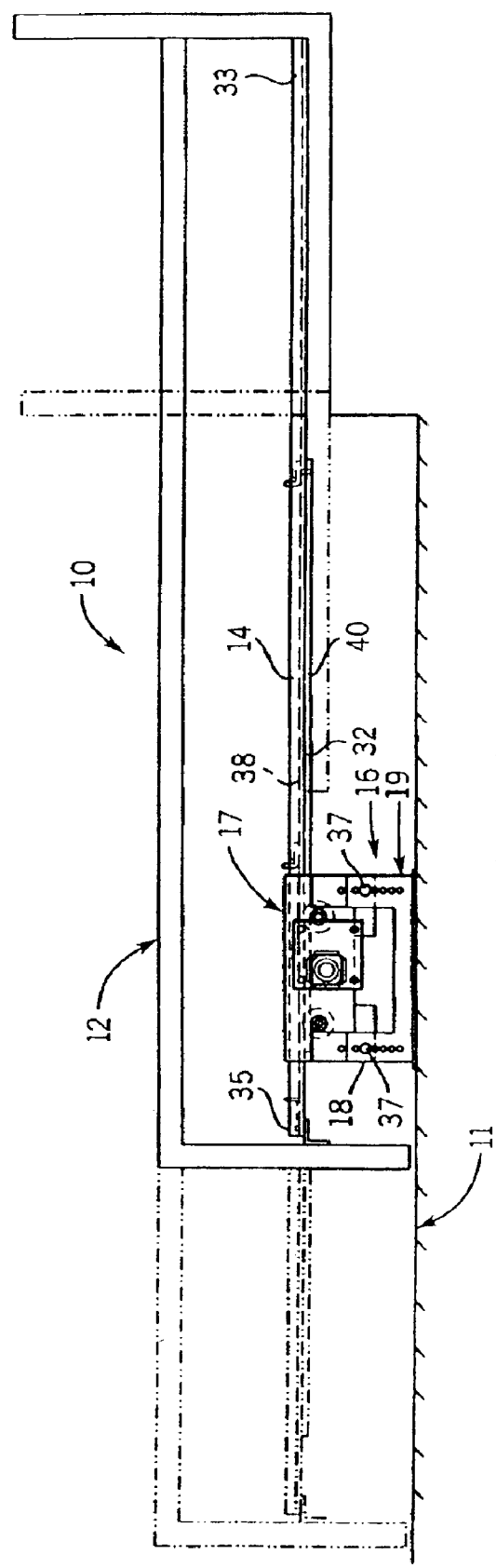
FIG. 1 is a side view of a vehicle stationary floor having a slide-out section incorporating the present invention.
Figure 9:
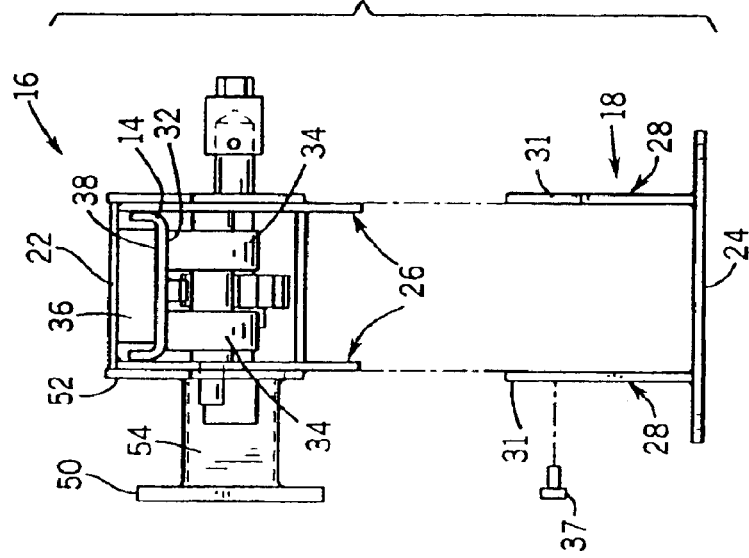
FIG. 9 is an exploded end view of the slide-out actuator of FIG. 1.
Figure 8:
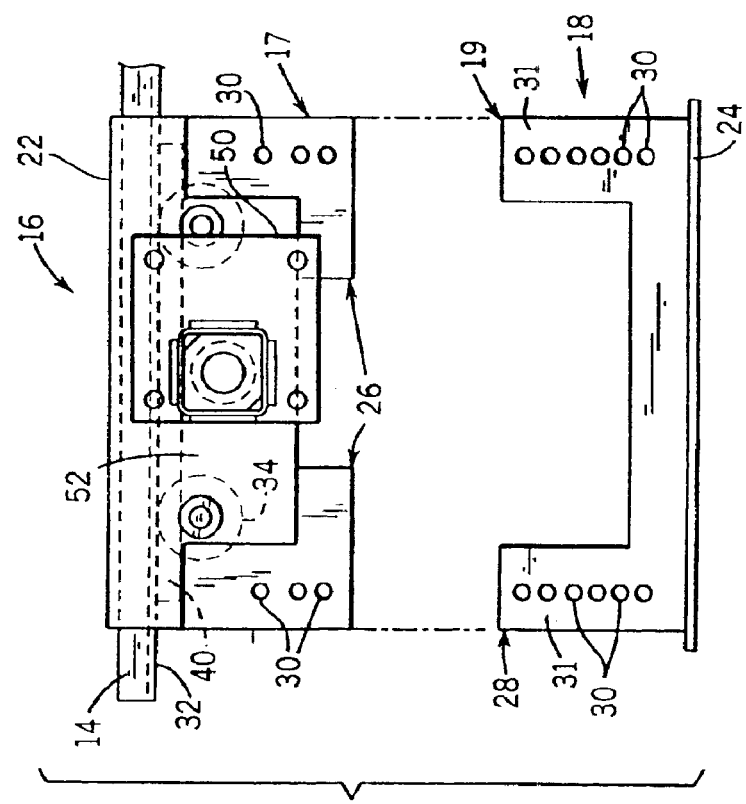
FIG. 8 is an exploded side view of the slide-out actuator of FIG. 1.

Referring now to FIG. 1, a bedroom slide-out 10 is mounted to a vehicle stationary floor 11. The bedroom slide-out 10 has a movable platform 12, such as suitable for use as a bed base, mounted to each end of a rail member, in this case a U-shaped channel 14. The U-shaped channel 14 is slidably mounted in an actuator 16 which forcibly moves the platform 12 between extended and retracted positions. The actuator 16 is rigidly mounted to the vehicle stationary floor 11, and extends and retracts the movable platform by forcibly sliding the U-shaped channel 14 with a rack and pinion drive. The moveable platform 12 is disposed above the actuator frame 18, and is mounted to both ends of the U-shaped channel 14.

The channel 14 is slidably disposed in the rail support or actuator frame 18, which simultaneously pushes and pulls the platform 12 to provide a smooth transition between the extended and retracted positions. The U-shaped channel 14 has a top surface 38, bottom surface 32, and the two ends 33, 35. A rack 40 mounted to the U-channel bottom surface 32 engages a pinion 42 rotatably mounted in the actuator 16 to urge the channel 14 in the desired direction.

As shown in FIG. 1, the slide-out actuator 16 has a rail support of frame 18 mounted to the vehicle floor 11. Looking particularly at FIGS. 3, 4, 6, and 7, the actuator frame 18 includes opposing sides 20 joined by a top plate 22 and a bottom plate 24. Each side 20 is formed from a pair of vertical slidably movable overlapping inner and outer plates 26, 28. The top plate 22 is fastened to the inner side plates 26 by methods known in the art, such as welding to form a frame upper assembly 17 which supports frame operating components, such as rollers 34, the pinion 42, a motor mount 50, a shaft 44, and the like. The bottom plate 24 is similarly mounted to the outer side plates 28 to form a frame lower assembly 19, and is mounted to the vehicle to secure the actuator 16 to the vehicle floor 11.

The inner side plate 26 is substantially rectangular, and can be cutout to reduce the plate material required. The outer side plate 28 is substantially rectangular, and has upstanding legs 31. The outer plate 28 is open between the legs 31 to provide room for the a shaft 44 and mount 50. Holes 30 are formed in the upstanding legs 31, and are in substantially the same plane as holes 30 formed in the inner plate 26 to allow alignment between a hole 30 in each plate 26, 28.

The height of the frame 18 is adjusted by slidably moving the overlapping plates 26, 28 to obtain the desired height. Each frame side 20 has a lower position, shown in FIGS. 2–4 and 8, and an upper position, with intermediate positions in between. The lower position is accomplished by aligning the lowest hole in the outer overlapping plate 28 on each side of the frame 18 with the lowest hole in the corresponding inner overlapping plate 26, and then pinning the plates 26, 28 together using a pin, such as a bolt 37. The upper position is accomplished by aligning the highest hole in the lower overlapping plate 28 on each side of the frame 18 with the lowest hole in the upper overlapping plate 26, and then pinning the plates 26, 28 together. Intermediate positions, such as the position shown in FIGS. 5–7 and 9, are accomplished by aligning various combinations of the holes 30, and fastening the plates 26, 28 together.

The height of the actuator 16 is fixed by aligning at least one of the holes 30 in the inner plate 26 with a hole 30 in the outer plate 28, and then fastening the plates 26, 28 together. Preferably, bolts or pins are secured in at least one pair of aligned holes 30 to fix the height of the actuator 16. Advantageously, the height adjustable frame 18 provides an easily adaptable actuator 16 for a plurality of applications.

The frame upper assembly supports the channel 14 and the pinion 42 for urging the channel 14 between the extended and retracted positions. In the preferred embodiment, the frame upper assembly includes two pairs of anti-friction members, preferably being two rollers 34 rotatably mounted to the plates 26 on opposing sides of the pinion 42. The rollers 34 engage the U-channel bottom on opposing sides of the rack 40 to support the channel as it slides through the frame. Each pair of rollers 34 are rotatably mounted to the inner plates 26 of the upper frame assembly on opposing sides of the pinion 42.

The pinion 42 is mounted to a rotatable shaft 44, journalled to the plates 26, and driven by an electric motor (not shown). The electric motor is mounted to mount 50, which is welded to plate 52. Plate 52 is bolted to plate 26, and shaft 44 extends through plate 26 and terminates in an end 54 which is engageable by the drive means. The opposite end of the shaft 44 may extend through the plate 26 on the opposite side of the frame 18, and have end 56 to be engaged, for example, by a shaft 60 that connects to the pinion 62 of a second slide-out actuator 64, acting as a synchronization mechanism, having a rail support or frame 66, shaft 68, rollers 70, rail member or channel 72 and rack 74, spaced laterally from the unit 16 as illustrated in FIG. 10, so as to synchronize the two units 16 and 64. Although an electric motor is disclosed, the shaft may be driven by other methods known in the art, such as manually.

A low friction block 36, such as UHMW, is mounted to the frame top 22, and engages the U-channel top 38 to keep the pinion 42 engaged with the rack 40. Advantageously, the block prevents the U-channel 14 from pivoting on one of the roller pairs 34 when the channel is substantially fully extended or retracted. Although a block is disclosed, other methods for maintaining the engagement of the rack with the pinion can be used, such as by using rollers, without departing from the scope of the present invention.

While there has been shown and described what are at present considered the preferred embodiments of the invention, it will be obvious to those skilled in the art that various changes and modifications can be made therein without departing from the scope of the invention defined by the appended claims.

Therefore, various alternatives and embodiments are contemplated as being within the scope of the following claims particularly pointing out and distinctly claiming the subject matter regarded as the invention.

What is claimed is:

1. A mechanism for adjustably setting the height of an extendable slide-out section of a vehicle, said mechanism comprising;
   a frame supporting the slide-out section relative to said vehicle;
   a first plate of the frame fixable to the vehicle and having at least one hole; and
   a second plate of the frame movable relative to said first plate and having a plurality of vertically spaced holes alignable with said at least one hole in said first plate so that a fastener can be inserted through said at least one hole and one of said plurality of vertically spaced holes to fix said first plate relative to said second plate at one of a plurality of heights.

2. The mechanism of claim 1, wherein the frame includes two spaced apart sides, each of said sides including one of said first and second plates.

3. The mechanism of claim 2, further including a rail member fixedly mounted to the slide-out section and a rack and pinion arrangement movably mounting the rail member to the frame.

4. The mechanism of claim 3, wherein said pinion is rotatably mounted between said second plates of said frame, said pinion engaging said rack of said rail member.

5. The mechanism of claim 4, further including a pair of rollers rotatably mounted between said second plates of said frame engaging said rail member.

6. The mechanism of claim 5, further including an anti-friction member disposed between said frame and said rail member.

7. The mechanism of claim 1, wherein said first plate includes a plurality of spaced apart holes each of which is linearly alignable with each of said plurality of spaced apart holes in the second plate.

8. An operating mechanism for extending a slide-out section of a vehicle, said operating mechanism comprising;
   a frame supporting the slide-out section relative to said vehicle;
   a pair of height adjustable rail supports mountable to said frame, said rail supports including two sections movable relative to one another and fixable with respect to one another at any of a plurality of different heights;
   a pair of rails connected to the slide-out section;
   a pair of rack and pinion arrangements movably mounting said rails to said rail supports so that said rails can extend and retract relative to said rail supports; and
   a shaft connecting said pinions so as to synchronize movement of said rails with respect to said rail supports.

9. The mechanism of claim 8, wherein said two sections of each rail support are first and second plates, said first plate being fixable to the vehicle and having at least one hole, said second plate being movable relative to said first plate and having a plurality of vertically spaced holes alignable with said at least one hole in said first plate so that a fastener can be inserted through said at least one hole and one of said plurality of vertically spaced holes to fix said first plate relative to said second plate at one of a plurality of heights.

10. The mechanism of claim 9, wherein said first plate includes a plurality of spaced apart holes each of which is linearly alignable with each of said plurality of spaced apart holes in said second plate.

11. The mechanism of claim 10, further including two pairs of rotatable rollers, each pair of rollers engaging an associated one of said rails.

12. The mechanism of claim 11, wherein the rollers define two roller surfaces, one on each side of the associated rack.

13. The mechanism of claim 10, wherein said pinions and racks have intermeshing teeth.

* * * * *